US008595041B2

(12) United States Patent
Schmidt

(10) Patent No.: US 8,595,041 B2
(45) Date of Patent: Nov. 26, 2013

(54) TASK RESPONSIBILITY SYSTEM

(75) Inventor: Martin Schmidt, Wiesloch (DE)

(73) Assignee: SAP AG, Walldorf (DE)

( * ) Notice: Subject to any disclaimer, the term of this patent is extended or adjusted under 35 U.S.C. 154(b) by 2217 days.

(21) Appl. No.: 11/348,637

(22) Filed: Feb. 7, 2006

(65) Prior Publication Data

US 2007/0185754 A1 Aug. 9, 2007

(51) Int. Cl.
*G06Q 10/00* (2012.01)
(52) U.S. Cl.
USPC ........ 705/7.11; 705/7.13; 705/7.21; 705/7.23
(58) Field of Classification Search
USPC .............................................................. 705/9
See application file for complete search history.

(56) References Cited

U.S. PATENT DOCUMENTS

| | | | | |
|---|---|---|---|---|
| 5,619,695 A | * | 4/1997 | Arbabi et al. | 718/100 |
| 5,953,229 A | * | 9/1999 | Clark et al. | 700/100 |
| 6,026,365 A | * | 2/2000 | Hayashi | 705/9 |
| 6,336,053 B1 | * | 1/2002 | Beatty | 700/108 |
| 6,345,259 B1 | * | 2/2002 | Sandoval | 705/7 |
| 2002/0055868 A1 | * | 5/2002 | Dusevic et al. | 705/9 |
| 2003/0078798 A1 | * | 4/2003 | Zaks et al. | 705/1 |
| 2004/0167652 A1 | * | 8/2004 | Ishii | 700/100 |
| 2004/0243266 A1 | * | 12/2004 | Mata et al. | 700/99 |
| 2005/0251418 A1 | * | 11/2005 | Fox et al. | 705/2 |
| 2006/0069604 A1 | * | 3/2006 | Leukart et al. | 705/9 |

* cited by examiner

*Primary Examiner* — Gregory Johnson
(74) *Attorney, Agent, or Firm* — Fish & Richardson P.C.

(57) ABSTRACT

Some embodiments of a task responsibility system may be implemented as an application to support people, machines, or both functioning in a manufacturing or production environment, warehouse environment, or other work environment. The focus is on a plant-local solution. In such circumstances, the task responsibility system may identify and direct one or more tasks to a computer-implemented folder independent of the worker(s), machine(s), or a combination thereof assigned to the folder. Thus, the system (or a user of the system) is permitted to dynamically assign a worker or machine to the computer-implemented folder subsequent to the tasks being directed thereto, in which case the worker or machine may be responsible for the tasks that are directed to the folder.

20 Claims, 13 Drawing Sheets

| My current folder(s): | Tank group B1 ▶ 302 301 | | Logon | Logoff |
|---|---|---|---|---|
| 📄 Tasks to be processed 316 | | | | |
| Type | Feas. | Description | Quantity | UoM | Confirmation |
|---|---|---|---|---|---|
| PS | ⭕ | Empty tank 12 to mobile tank x9 | 67.8 | Liter | Confirm |
| PS | ⬤ 335 | Clean tank 12 332 | | | Confirm |
| Alert | | Material shortage for line 1 ! | | | Confirm |
| PS | ⬛ 334 | Pump liquid from mixer to tank 1 | 102.5 | kg | |
| 320 | 322 | 324 | 326 | 328 | 330 |

FIG. 3

TASK RESPONSIBILITY SYSTEM

TECHNICAL FIELD

This document relates to assigning tasks to be performed by one or more task executors, such as workers or machines in a manufacturing or production environment, a warehouse environment, or other worker environment.

BACKGROUND

Businesses and other entities often use planning and order entry applications to organize the production, storage, and shipping of manufactured products. For example, a manufacturing business may employ a planning application to organize the production of various orders from customers long before the workers or machines on the manufacturing floor are scheduled to start production. Such planning applications may be used in the early planning stages of the production process, and workers or machines in the manufacturing environment are then obligated to review and implement the production schedule developed by the planning application.

Some conventional planning applications may not provide a suitable transition between the conceptual world of the early planning stages and the reality of the manufacturing floor or other work environment. In certain circumstances, people working in a production environment (e.g., line operators, shift leaders, supervisors, quality inspection staff, plant maintenance staff, or the like) may be required to review hardcopies of the production orders, shipping schedules, and other documents or transactions from the planning application so as to prepare a separate list of the work items that should to be performed by individual workers or machines that particular day, work shift, or week. Frequently, the production orders, shipping schedules, and other documents or transactions from the planning application include large amounts of information not relevant to the individual work items or a worker or machine on a particular day. For example, the plant manager or shift leader in a production environment may be obligated to break down a hardcopy of a production order based upon the resources available in the production environment that day, work shift, or week to determine which work items (e.g., replenish supply hopper 1, repair jam in production line 5, confirm production of 2000 parts from line 8, perform schedule cleaning of machine A, pull product samples production line 12 for quality testing, etc.) should be performed on a particular day, work shift, or week in furtherance of completing the overall production order.

After identifying the work items that should to be performed on a particular day, work shift, or week by individual workers or machines in a production environment, these work items may be assigned directly to an individual worker or machine. In such circumstances, advance notice of which workers or machines will be available and functional on that particular day may be required before the work item can be assigned. Further, such a system for assigning work items directly to particular workers or machines may prevent or otherwise hinder real-time prioritization and assignment of work items in response to exceptional circumstances (e.g., a production line failure, supply material shortages, worker illness or absences, etc.) that may require shifting or reassigning responsibilities in a dynamic or near-time environment.

SUMMARY

Some embodiments of a task responsibility system may provide a flexible interaction between planning stages and execution stages in a manufacturing or production environment, warehouse environment, or other work environment. The system may drive execution tasks in the work environment in "near-time" and may permit dynamic reaction to unscheduled or exceptional events in the work environment. Some embodiments of the system may be implemented as a task responsibility application for local use in a manufacturing or production environment, warehouse environment, or other work environment. For example, tasks may be directed to one or more task folders that can be configured by a local manager to reflect the local organization of the manufacturing plant. In these circumstances, a supervisor (e.g., plant manager, shift leader, or the like) may dynamically assign an individual worker, a group of workers, an automated machine, or a combination thereof to particular folders subsequent to the tasks being directed to those folders.

Some embodiments may include a computer-implemented method for directing tasks to be performed by one or more task executors in a work environment. The method may include directing one or more tasks to a computer-implemented folder assignable to multiple different task executors. At least one of the tasks may represent a work item to be performed in a work environment. The method may also include assigning a task executor to the computer-implemented folder so that the tasks are electronically communicated to the task executor indicating that the tasks are to be completed by the task executor. The task executor may comprise at least one of a human user in the work environment or a machine in the work environment.

Some embodiments may include a system for directing tasks to be performed by one or more task executors in a work environment. The system may include one or more computer-implemented folders to receive tasks related to a work environment. Each of the computer-implemented folders may be assignable to multiple different task executors. Each of the task executors may comprise at least one of a human user in the work environment or a machine in the work environment. The system may also include an executable program stored on a computer-readable medium that, when executed, causes the particular operations to occur. One operation may be to direct one or more tasks to at least one of the computer-implemented folders, at least one of the tasks representing a work item to be performed in the work environment. Another operation may be to assign a task executor to the at least one computer-implemented folder so that the tasks are electronically communicated to the task executor indicating that the tasks are to be completed by the task executor.

These and other embodiments may provide one or more of the following advantages. First, some embodiments of a task responsibility system may direct one or more tasks to a task folder independent of the worker(s), machine(s), or a combination thereof assigned to the folder. In such circumstances, the system (or a user of the system) may dynamically assign a worker or machine to the task folder subsequent to the tasks being directed thereto, in which case that worker or machine may be responsible for the tasks that are directed to the folder.

Second, the task responsibility system may be capable of dynamically or flexibly defining the area of responsibility for a particular worker or machine in the work environment. As such, a worker or machine's area of responsibility may be assigned or reassigned in real-time to account for the current staffing of the work environment, the available resources in the work environment, any exceptional circumstances (e.g., machine failure, supply shortage, worker illness, etc.) in the work environment, or other such factors.

Third, some embodiments of the task responsibility system may provide a user interface that permits a worker or supervisor user to interact with the system. For example, a supervisor user may create and direct all daily tasks for a user interface, may monitor the status of tasks, workers, machines, and other resources, may sort, prioritize, and direct tasks to colleagues, may reject, redirect, forward, or reply to tasks sent from other users or applications, may be promptly notified when exceptional situations arise, and may create remarks or comments for subsequent shift workers or supervisors. In another example, a worker may interact with the user interface to receive a task list for the current work shift, to review remarks or comments from the previous shift worker, to check the status of the production line, to direct or redirect tasks to other workers, to monitor the progress of the current tasks, to promptly react to exceptional situations (e.g., line failure, line overload, exceeding critical values, material shortages, quality problems, etc.), to report the progress to a planning staff or to a backend planning application, and to create tasks, remarks, or comments for the subsequent shift worker.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is another example of a screen view that may be displayed in the system of FIG. 1.

Like reference symbols in the various drawings indicate like elements.

DETAILED DESCRIPTION OF ILLUSTRATIVE EMBODIMENTS

Some embodiments of a task responsibility system may be implemented as an application to support people, machines, or both functioning in a manufacturing or production environment, warehouse environment, or other work environment. In such circumstances, the task responsibility system may identify and direct one or more tasks to a computer-implemented folder independent of the worker(s), machine(s), or a combination thereof assigned to the folder. Thus, the system (or a user of the system) is permitted to dynamically assign a worker or machine to the computer-implemented folder subsequent to the tasks being directed thereto, in which case that worker or machine may be responsible for the tasks that are directed to the folder.

Figure 1:
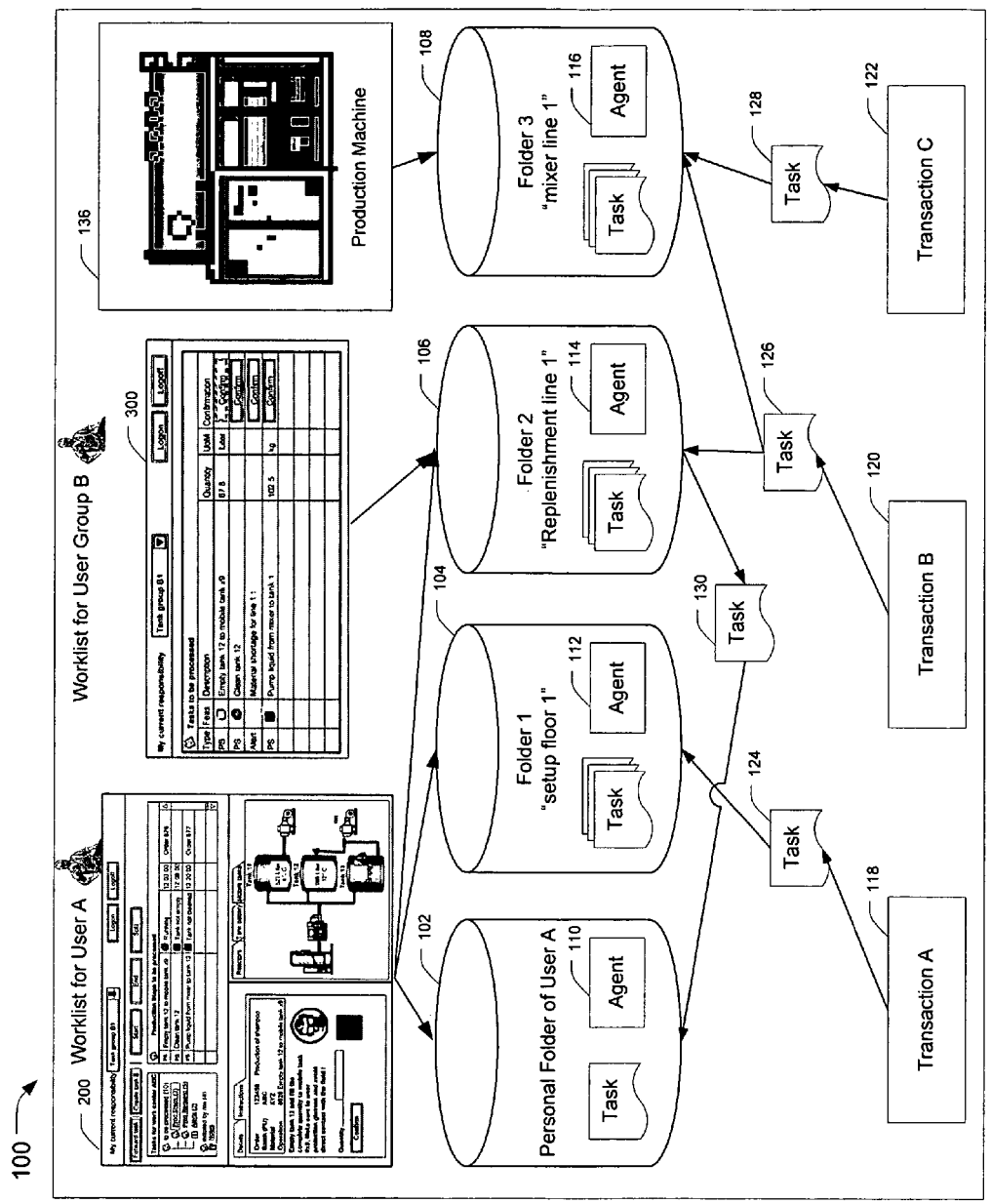
FIG. 1 is a diagram of a task responsibility system in accordance with some embodiments of the invention.

Referring to FIG. 1, an exemplary task responsibility system 100 includes a plurality of task folders 102, 104, 106, 108. The task folders 102, 104, 106, 108 may be computer-implemented folders that receive tasks electronically. A task may represent a work item to be completed or acknowledged in a work environment, such as, for example, a manufacturing plant or a warehouse facility. For example, a task may be a cleaning operation of a solution tank, a supply operation for purchasing manufacturing supplies, a replenishment operation for a supply hopper, a repair operation for a nonfunctional machine, a confirmation operation for a quantity of productions output from a production line, or a quality-assurance operation to test the final product. In this embodiment of the task responsibility system 100, the tasks may be directed to the task folders 102, 104, 106, 108 independent of task executers assigned to those folders. In some embodiments, the task responsibility system 100 may include one or more task agents 110, 112, 114, 116 linked to the task folders 102, 104, 106, 108. The task agents 110, 112, 114, 116 may be configured to automatically process some or all tasks in the task folders 102, 104, 106, 108. In some embodiments, the task agents 110, 112, 114, 116 may comprise a software module that contains rules to perform certain actions in response to a trigger event (e.g., the arrival of a new task in the folder).

In some embodiments, the task responsibility system 100 may receive tasks 124, 126, 128 from one or more transactions 118, 120, 122, which may be made available from a backend planning application or the like. The transactions 118, 120, 122 may be electronic documents that represent at least one operation to be performed in the work environment. For example, the transaction A 118 may represent a production planning document, such as a production order from a customer. In another example, the transaction B 120 may represent a shipping request that specifies a shipping date for a certain amount of product. In a further example, the transaction C 122 may represent a document that specifies a recurring operation, such as a periodic quality control test on samples from the production line. The transactions 118, 120, 122 may be used by the backend planning application or by the task responsibility system 100 to generate a plurality of tasks to be handled by the task responsibility system 100. In some embodiments, the transactions 118, 120, 122 may be represented as business objects in a database from, for example, a backend planning application. In those embodiments, the business objects may be used by the backend planning application or by the task responsibility system 100 to generate a plurality of tasks 124, 126, 128 to be handled by the system 100.

In some embodiments, tasks may be software objects that implement an interface that allows access to the data and method of the tasks. For example, a task may be a stone-alone object that contains its own data or logic. As another example, a task may be a proxy for a transaction, and the task may keep a reference to the transaction. As yet another example, a transaction or a business object, such as a production order document, may implement the task interface and act as a task in the task responsibility system 100.

In some embodiments, a backend application may create tasks 124, 126, 128 automatically when it detects an event. For example, the backend application may create tasks 124, 126, 128 when the backend application detects a new transaction, such as a release of a production order. In another example, the backend application may create tasks 124, 126, 128 when the backend application detects a follow-up action from other tasks (e.g., an over-due production order alert). In yet another example, the backend application may create tasks 124, 126, 128 when the backend application detects a status change in other tasks (e.g., a confirmation of a finished task from a production machine). In other embodiments, a backend application may create tasks 124, 126, 128 manually when a user instructs the backend application to create tasks. For example, the backend application may create tasks 124, 126, 128 when there is an unplanned or exceptional situation, such as an unplanned rework of a product.

In some implementations, one or more backend applications may direct tasks to different task folders, either manually (e.g., selected by a human operator) or automatically. Still referring to FIG. 1, the backend applications may create the task 124 according to the transaction A 118 and assign the task 124 to the task folder 104. The backend applications may create the task 126 according to the transaction B 120 and assign the task 126 to two task folders 106, 108. The backend applications may create the task 128 according to the transaction C 122 and assign the task 128 to the task folder 108.

In some implementations, administrating users (e.g., system users with supervisory or administrative clearance) may create and delete task folders in any number so that the folders reflect the organization of the local work environment (e.g., a manufacturing plant). For example, a local administrator may create the folder 102 to store personal tasks to be completed or acknowledged by a particular task executor, such as User A. A local administrator may also create the folder 104 to store the tasks to be completed or acknowledged in a particular plant, such as the setup of floor 1. In another example, a local administrator may create the folder 106 to store all the tasks to be completed or acknowledged for another area of the work environment, such as a replenish line 1. In yet another example, a local administrator may create the folder 108 to store the tasks to be completed or acknowledged by a mixer line 1. As shown in FIG. 1, the task 126 can be assigned to more than one folder. Also, in some embodiments, the task 130 may be redirected from one folder 106 to another folder 102, or an agent 114 in a folder 106 may generate the task 130 that is then directed to a different folder 102.

In some implementations, task agents 110, 112, 114, 116 may be linked to task folders 102, 104, 106, 108. In this implementation, one or more task agents is linked to one corresponding task folders 102, 104, 106, 108 but a task folder 102, 104, 106, 108 may have multiple task agents 110, 112, 114, 116. As previously described, the task agents 110, 112, 114, 116 may comprise of a software module that may act independently in response to triggering events in the corresponding folder 102, 104, 106, 108. The task agent 110, 112, 114, 116 may support human users that are assigned to the corresponding folder 102, 104, 106, 108, may act as a stand-alone object to support, for example an automated machine assigned to the correspond folder 102, 104, 106, 108, or may support human users and act as a stand-alone object. The task agents 110, 112, 114, 116 may be triggered by events that occur in their linked folders 102, 104, 106, 108 (e.g. a new task arrived or an existing task completed), by a periodic background job (e.g. a daily refresh operation), or by a manual operation of a user (e.g. a user presses a button to invoke a task agent to perform an action). Depending on the implementations, task agents may execute one or more agent actions if it is triggered and determines that a set of predefined conditions are true. Some examples of agent actions are forwarding a task, printing a task report, sending an SMS message, automatically confirming the completion of a task, or store relevant information in an archive. In one example, the task agent 114 may be triggered to forward a task 130 from the folder 106 to the folder 102.

Still referring to FIG. 1, task executors may be flexibly and dynamically assigned to one or more task folders 102, 104, 106, 108 in the system 10. A task executor may be a human user in the work environment or may be a production machine in the work environment. The task executor may be assigned to one or more folders so that the executor is responsible for the tasks in these folders. Also, a task folder may have one or more task executors assigned thereto so that the one or more task executors are responsible for the tasks in that particular folder. As such, a supervisor may dynamically assign different human users or machines to different folders to at least partially define the area of responsibility for each task executor in that point in time.

In some implementations, the task folders 102, 104, 106, 108 may act as queues for machines (e.g., automated machines in the work environment) or as work lists for human users in the work environment. For example, the task folder 108 may act as a queue of tasks for production machine 136. The production machine 136 may be selected by a supervisor user to be responsible that day for tasks already directed to folder 108 and for tasks that will be directed to folder 108 later that day. For example, the production machine 136 may be one of a group of automated mixers selected by a plant manager to handle the tasks directed to the "mixer line 1" folder 108 (and other mixers may be assigned to other "mixer line" folders not shown in FIG. 1). In some implementations, the production machine 136 may access the folder 108 to obtain a list of queued tasks to be completed. The production machine 136 may then choose a task from the list to work on. After a task is completed, the production machine 136 may change the status of a queued task via, for example, an application interface (API) or the task agent 116. In other embodiments, the production machine 136 may receive a task from the queued tasks and may wait for another task after the first task is completed. For example, the task agent may push the tasks to the machine 136 one at a time, and the machine 136 may communicate the completion of a first task to trigger the push of another task. The task responsibility system 100 may include one or more work stations or display devices that are capable of displaying a user interface (UI) to one or more users. For example, the system 100 includes a UI 200 for viewing by a human user in the work environment, such as, user A. Also, the system 100 may include a UI 300 for another user, such as, users in user group B. The user A or the user group B may use the exemplary UIs 200, 300 to view their respective work lists, which may be all or a portion of the tasks in the folders. Depending on each user's area of responsibility, a user may monitor the tasks in one or more folders. Using the UIs 200, 300, a user may complete or acknowledge the tasks in the user's area of responsibility by viewing the information about the task (e.g., the procedure, points of cautions about the task, or due date of the task), by changing the status of a task (e.g., mark a task started or completed), by forwarding the task to another folder or by other actions. The user interface may provide a detailed format (e.g., UI 200) or may provide a simplified format (e.g. UI 300) depending upon the settings established by the supervisor, the type of display device, the skill level of the user, and other factors.

Figure 2:
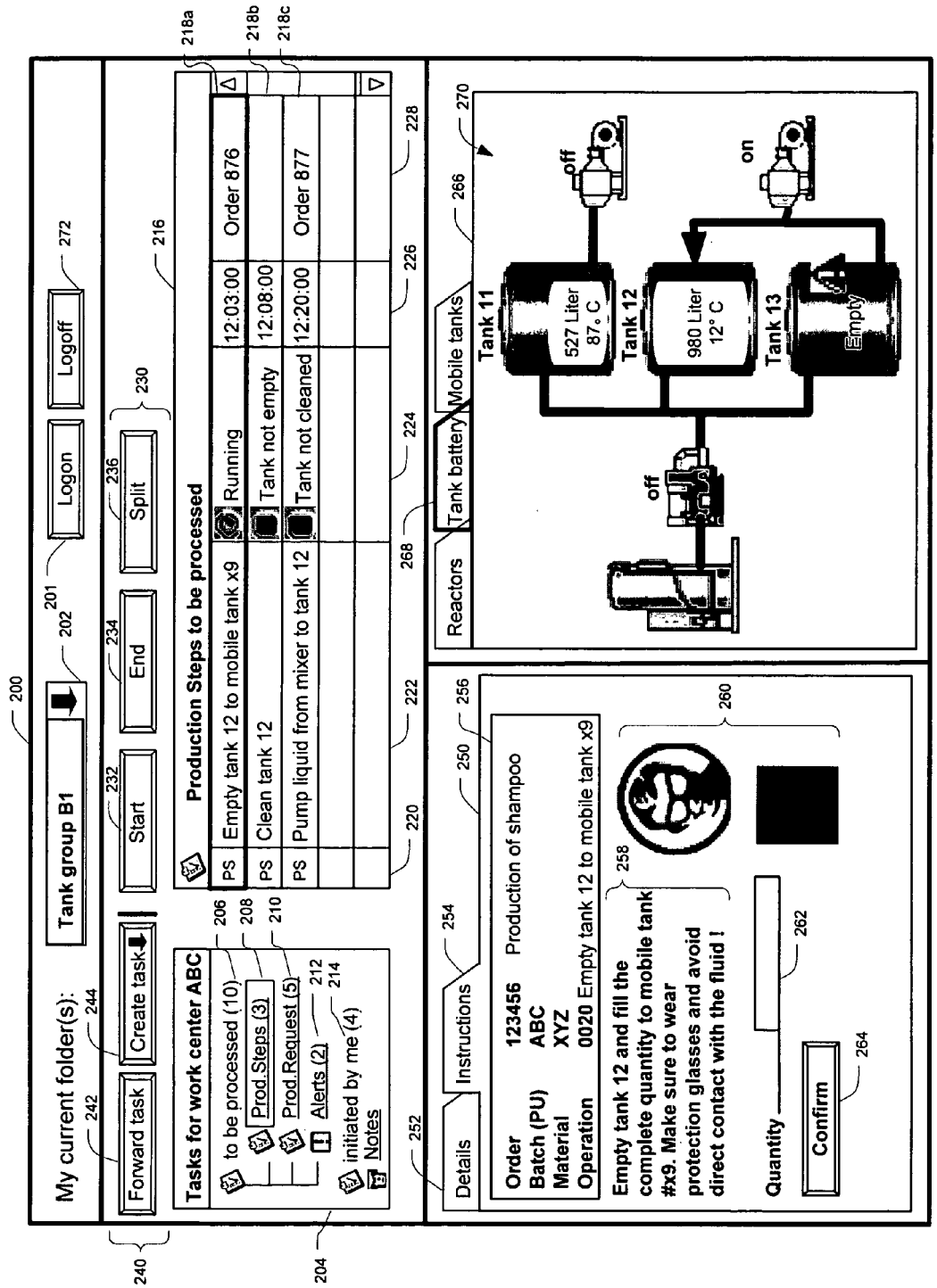
FIG. 2 is an example of a screen view that may be displayed in the system of FIG. 1.

Referring to FIG. 2, users may use the UI 200 to view assigned task according to the user's current responsibility, to obtain information on the currently selected task, and to process tasks (e.g., start, complete, acknowledge, or the like) in the task folders. In this embodiment, the user A may access the UI 200 by logging on to the system 100 by pressing a Logon button 201. After logon, the user may use a control menu 202 to view the user's current responsibility. The user A of the UI 200 may be assigned to multiple folders (e.g., folders 102, 104, and 106 shown in FIG. 1). The UI 200 may populate the control menu 202 by all the folders assigned of the user A. For example, the current user of the UI 200 may be responsible for his personal work (e.g., tasks in folder 102), the tank group B1 (tasks in folders not shown in FIG. 1), and the replenishment line 1 (e.g., tasks in folder 106 in FIG. 1). By selecting the current responsibility using the control 202, the UI 200 may select a task folder (or, in some embodiments, a set of task folders) to be displayed. For example, the control menu 202 of the UI 200 is selected in FIG. 2 to display the tasks in the task folders related to "Tank group B1" and the user may use the control menu 202 to view tasks in other folders or in all folders assigned to the user.

The UI 200 may include a view selection window 204. Upon the selection of the current responsibility using the control menu 202, the UI 200 may populate the view selection window 204 by a list of personalized views of the selected task folders. By selecting a view option, the view selection window 204 filters the tasks in the selected folder to be displayed. As shown in FIG. 2, the view selection window 204 includes a "to be processed" view 206, a "Prod.Steps" view 208, a "Prod.Request" view 210, an "Alert" view 212, an "initiated by me" view 214, and a "note" view. Upon selection, tasks in the selected view may be displayed. The view selection window 204 is organized in a hierarchical structure. For example, the "to be processed" view 206 may have subviews the "Prod.Step" view 208, the "Prod.Request" view 210, and the "Alert" view 212. Each of the view selections 206, 208, 210, 212, 214 may indicate a number of entries in the view. In one embodiment, the UI 200 may allow users to filter tasks using the task type. For example, the selected folders contain ten tasks in the "to be processed" view 206. Within the ten tasks, three may be in production step task type, five may be in production request task type, and two may be in alert task type. The tasks of the production step tasks can be displayed using the "Prod.Step" view 208. The tasks of the production request tasks can be displayed using the "Prod.Request" view 210. The tasks of the alert tasks can be displayed using the "Alert" view 212. By filtering the tasks according to the selected view, different tasks may be displayed. In this example, the "Prod.Steps" view 208 has been selected, which allows the UI 200 to display the production steps to be processed in a work list window 216.

Still referring to FIG. 2, the work list window 216 may display at least a portion of the tasks in the user's area of responsibility (at least partially defined by the folders to which the user is assigned). In this embodiment depicted in FIG. 2, the work list window 216 displays the three tasks 218a, 218b, 218c involving production steps to be processed in the "Tank group B1" area. The order of displaying the tasks may follow specific rules defined in the filters or rules defined in the folder, for example, by the task agents in the folder. In this case, the tasks 218a, 218b, 218c are displayed in the order of production steps. That means the task 218a should be completed before the start of task 218b, and in turn, task 218b should be completed before the start of task 218c. In the depicted embodiment, the work list window 216 may include a type column 220, a description column 222, a status column 224, a time column 226, and an related transaction column 228. In the type column 222, all three tasks 218a, 218b, 218c are indicated as "PS," meaning they are all production steps. The description column 222 contains a brief description of the tasks 218a, 218b, 218c. As shown, in the depicted embodiment, the task 218a is to empty tank 12 to mobile tank x9. The task 218b is to clean tank 12. The task 218c is to pump liquid from mixer to tank 12. The task status column 224 may indicate current status of the task. As shown, the task 218a is currently running. The task 218b cannot be run because the tank 12 is not empty, and the task 218c cannot be run because the tank 12 is not cleaned. The time column 226 may indicate the estimated time at which the task should be completed. The related transaction column 228 may indicate the transaction from which the tasks was created or is otherwise related to. In the depicted embodiment, the task 218a is related to an order number 876, and the task 218c is related to an order number 877. It should be understood that not all tasks are related to a particular transaction, in which case the related transaction column 226 may be blank.

When a task 218a, 218b, or 218c is selected in the work list window 216, the user may process the selected task using a status change tool bar 230 and a transfer-create tool bar 240. The status change tool bar 230 may shows commands that are related to a task selected in the work list window 216. It should be understood that different tasks or task types may cause different buttons to be displayed in the status change tool bar 230. As shown in FIG. 2, the status change tool bar 230 may include a start button 232, an end button 234, and a split button 236. A user may select the start button 232 to indicate the start of the selected task. Users may select the end button 234 to indicate the end of the selected task. Users may select the split button 236 to split the selected task into multiple tasks. The transfer-create tool bar 240 shows other commands that may be selected by the user. In the UI 200, a user may use a forward task button 242 to forward a selected task to another task folder (e.g., redirect task 130 from folder 106 to folder 102 as shown in FIG. 1) and use a create task button 244 to generate a new task that may be directed to the folder identified in the control menu 202.

In this example, task 218a has been selected in the work list window 216 of the UI 200. Some details and instructions to perform the task 218a may then be displayed in a task detail window 250. The task display window 250 may include different information of the selected task, depending on the selected task, the task type, the skill level or clearance of the user, or other factors. In this implementation, the task display window 250 includes a detail tab 252 and an instruction tab 254. In the detail tab 252, task specific details, such as a process instruction (PI) sheet, an alert long text, or a material list may be displayed. The instruction tab 254 may include some information related to performance or completion of the selected task. Such information may include a description area 256 that describes the transaction or business object related to the task. In this example, the selected task 218a is related to the production of shampoo with the order number 123456. The description area 256 may also describe other features, such as the batch number, the material used, and the task name of the task. The instruction tab 254 may also include an instruction area 258 and a set of warning graphics 260 to remind task executors of the required protection procedures and the possible hazards for performing the task 218a. The instruction tab 254 may include an input box 262 for the user to enter data, such as a quantity. For example, some task may require the user to input the quantity of material that was emptied from a tank. In such circumstances, the user may be unable to complete the task until the quantity is typed into the input box 262 and confirmed. When the user seeks to complete the task, the user can select a confirm button 264 to inform the system 100 that the selected task has been completed.

Optionally, some additional information of the resource (e.g., production machines) related to the task may be displayed in a resource window 266. In this example, UI 200 may provide "real-time" graphical representations of reactors, a tank battery, and mobile tanks related to the selected task. As shown in FIG. 2, a Tank battery tab 268 has been selected in the resource window 266 and a window 270 shows current connections and operations of the selected tank batteries.

The user may use a Logoff button 272 to log off when the user has finished using the UI 200. For example, the user A may log onto the UI 200 at the beginning of shift. The user A may process the tasks in the responsible area during the shift using the UI 200. At the end of shift, the user A may log off using the Logoff button 272. The system 100 may monitor that user is logged off, and in some circumstances, may generate an alert task to notify other users (e.g., in the event that all users assigned to a particular folder have logged off.

Referring to FIG. 3, some embodiments of the system 100 may include a UI 300 configured to provide a list of tasks in a simplified format. The system 100 may include UI 300 in addition to or as an alternative to, UI 200 (FIG. 2). The UI 300 may be used to view assigned tasks according to the user's current responsibility, to obtain information on the currently selected task, and to process tasks (e.g., start, complete, acknowledge, or the like) in the task folders. The UI 300 may display some or all the task commands as buttons so that users may be readily manipulate the functions displayed on the UI 300. For example, such button commands may be selected using a touch screen, a membrane switch, a computer mouse or keyboard, a keypad of a cellular phone or other portable device, or the like. In this example, the user may access the system 100 by pressing a Logon button 301. Similar to the UI 200 described in connection with FIG. 2, the UI 300 includes a control menu 302 that the user may use to view the user's current responsibility (which maybe at least partially defined by the folders to which the user has been assigned). The UI 300 may populate the control menu 302 by all the folders assigned to the user.

In the depicted embodiment, the UI 300 includes a work list window 316 which may display some or all the tasks assigned to the user's current responsibility. A user may select the user's current responsibility from the control menu 302. Then the UI 300 may populate the work list window 316 with some or all of the tasks 318a, 318b, 318c, 318d related to the user's current responsibility. The work list window 316 may include a type column 320, a feasibility column 322, and a description column 324, all of which may provide a description of the tasks assigned to the user's current responsibility. The type column 320 may indicate the task type of each task included in the work list window. For example, the task 318a may be a production step ("PS" as shown in FIG. 3) task type, and the task 318c may be an alert ("Alert" as shown in FIG. 3) task type. The feasibility column 322 may contain information on the feasibility or status of the listed tasks 318a, 318b, 318c, 318d. For example, in the UI 300, the feasibility column 322 contains an icon 332 (e.g., a green light) indicating that the task 318b is feasible to be executed now. Also in this example, the feasibility column 322 also contains an icon 334 (e.g., a red light) indicating that the task 318d is not feasible to be executed now. Continuing with this example, the feasibility column 322 contains an icon 335 (e.g., an empty light) indicating that the task is currently in process or has recently been completed (e.g., by pressing "confirm" button 336). In some implementations, not all tasks may have a feasibility issue. For example, the task 318c is an alert, which may not have a feasibility issue. In this case, the feasibility column 322 may be blank for the task 318c. Similar to the column 222 previously described in connection with FIG. 2, the description column 324 may include a text description of the tasks listed in the work list window 316.

Still referring to FIG. 3, users may view or enter tasks attributes directly in the work list window 316. Users may be able to view or enter attributes related to the listed tasks 318a, 318b, 318c, 318d. For example, the work list window 316 may include a quantity column 326 and a unit of measurement column 328. The quantity column 326 may display the quantity to be completed in the task. The unit of measurement column 328 provides the unit related to the quantity displayed in the quantity column 326. For example, the task 318d may be "pump liquid from mixer to tank 1" and the quantity of the liquid to be pumped for the task 318d is 102.5 kg. As such, the user may be assigned to pump 102.5 kg of liquid from mixer to tank 1 when executing the task 318d. After the 102.5 kg of liquid has been pumped, the user may indicate the completion of the task 318d by pressing the "confirm" button 338.

In this embodiment, users may process a task using the command column 330. The command column 330 may display one or more commands related to the task, depending on the task type, the currently selected folder, the feasibility of the task, or other factors. As shown in FIG. 3, the command column 330 may include a confirmation button for each of the tasks 318a, 318b, 318c, 318d. A user may use the confirmation button to acknowledge the completion of a task.

Figure 4:
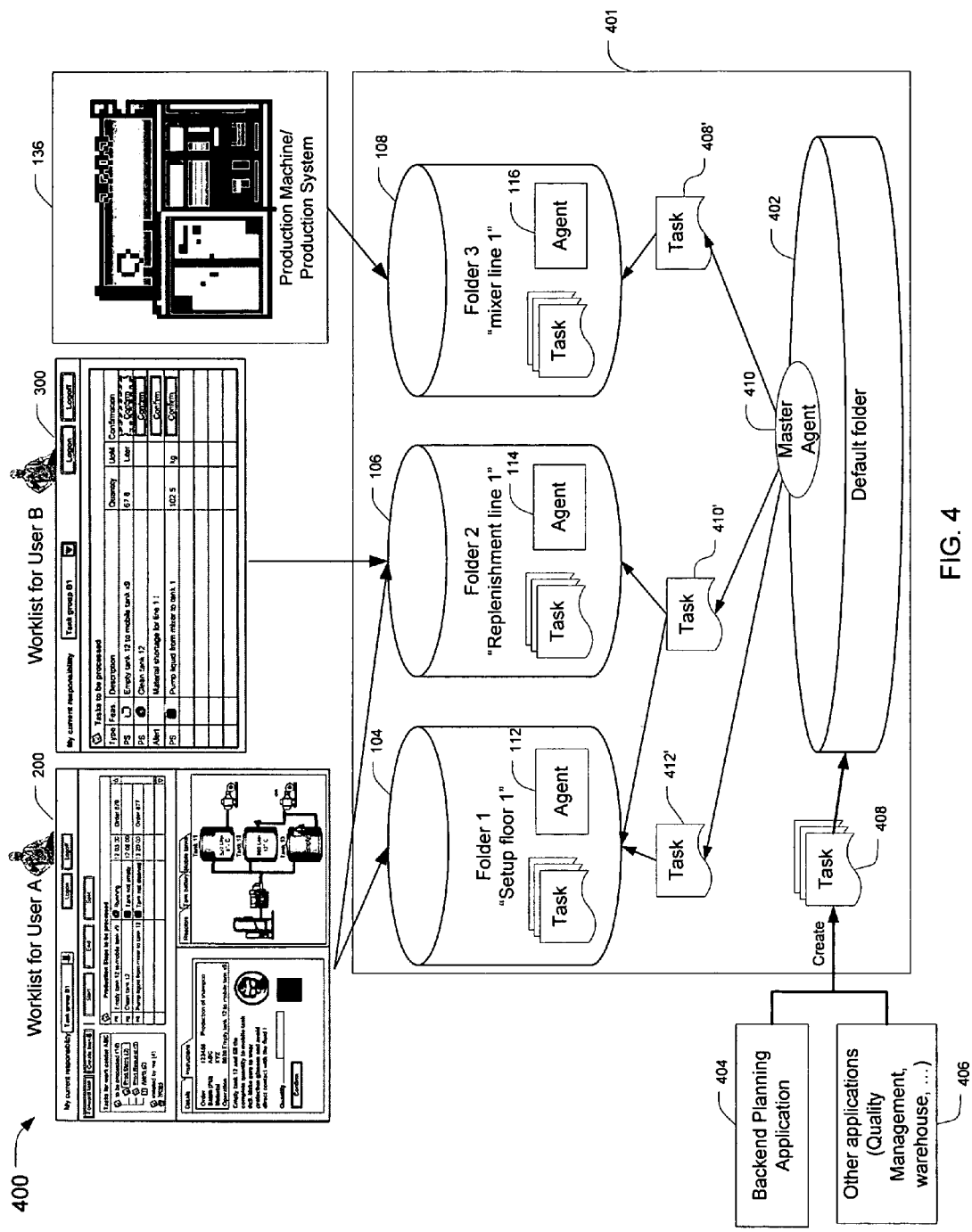
FIG. 4 is a diagram of a task responsibility system in accordance with some embodiments of the invention.

Referring to FIG. 4, some embodiments of a task responsibility system 400 may include a task distribution subsystem 401 in which is responsible for directing tasks created by or otherwise based upon a backend planning application 404 or other applications 406 (e.g., quality management application, warehouse application, or the like). The task distribution subsystem 401 may include a default folder 402 and a plurality of task folders 104, 106, 108. Tasks may be created by or otherwise based upon various transactions (e.g., similar to the transactions 118, 120, 122 described in FIG. 1) and may be initially directed to the default folder 402. It should be understood that the default folder 402 is not necessarily superior to the other task folders 104, 106, 108. In one example, the backend planning application 404 may provide a transaction document, such as a production order for shampoo product, and the backend planning application 404 may then create a number of tasks (including a task 408) to the task distribution subsystem 401. These tasks may comprise a set of work items that should be performed on the manufacturing floor in order to produce the desired product. In another example, a quality management application 406 may create a number of tasks, such as the task 408, that initiates a periodic quality test for the products on the production line. In a further example, a maintenance application may create a task 408 that initiates a scheduled cleaning task 408 to be performed on a machine on the production floor. The incoming tasks (including the task 408) from the backend applications 404, 406 may be initially directed to the default folder 402, which may be configured to distribute the tasks to one of the task folders 104, 106, 108. In yet another embodiment, a backend planning application 404 may provide access to a particular transaction so that the task distribution subsystem 401 (e.g., a module in the default folder 402 or another component of the subsystem 401) may then create a number of tasks (including a task 408). These tasks may comprise a set of work items that should be performed on a manufacturing floor in order to fulfill the accessed transaction.

In some embodiments, the default folder 402 may include a master agent 410 that is configured to support a supervisor user or other human user by automatically directing some or all of the incoming tasks to particular tasks folders 103, 106, 108 based upon predetermined rules. The master agent 410 may comprise a software module that can act independently in response to triggering events in the default folder 402 or in the task folders 104, 106, 108. It should be understood that the master agent 410 is not necessarily in a master/slave relationship with or superior over the other task agents in the task folders 104, 106, 108. Rather, in some embodiments, the master agent 410 is the task agent that automatically directs some or all of the incoming tasks. As described in more detail below in connection with FIG. 5, a supervisor user may access the default folder to view incoming tasks, to direct or redirect particular tasks to configure the rules of the master agent 410, or to perform other actions in the default folder. In such circumstances, the master agent 410 may support the supervisor user by automatically performing some or all actions. The master agent 410 may operate on a set of rules that define the response to particular trigger events, such as a new task arrived in the default folder 402, a task completed in one of the task folders 104, 106, 108, or an alert arrived in the default folder 402. The rules in the master agent 410 may determine actions to be taken in the default folder 402. In one example, a newly arrived task 408 may be a trigger event that causes the master agent 410 to direct the task 408' to the task folder 108. In another example, an alert task arrived in the default folder 402 may trigger an action to send a short messaging service (SMS) message or a text message to a supervisor user.

In some embodiments, the master agent 410 may be responsible for automatically directing the tasks received by the default folder 402 to other task folders 104, 106, 108 in the task responsibility system 400 automatically. A task folder may be related to planning relevant objects such as task executors (e.g., production machines, human workers, supervisor users, or other resources), locations (e.g., production floor 1, warehouse area B, or the like), supply sources, and other objects. For example, the task folder 108 may be related to a particular resource "mixer line 1." In another example, the task folder 104 may be related to a particular location "floor 1." In yet another example, the task folder 106 may be related to a particular supply area "replenishment line 1." In such circumstances, a task folder 104, 106, 108 may be related to a business object (e.g., a particular production order) in a planning application database. For example, a task folder 104, 106, or 108 may include a description in the name of the task folder or defined using other methods so that tasks created by the backend planning application 404 may be properly directed to the task folder 104, 106, or 108. The tasks (e.g., task 408) in the task distribution subsystem 401 may include dispatch information that is related to relevant objects such as task executors or other resources, locations, or supply sources. The master agent 410 may be configured to identify the relationship between the incoming tasks 408 and the existing folders 104, 106, 108 in the system 400. In one example, the master agent 410 may include rules in a software module that are capable of identifying the name and/or the description of the task folders 104, 106, 108 so that the incoming tasks 408 having dispatch information similar to the name and/or description of the task folder 104, 106, 108 may be directed thereto. In another example, the master agent 410 may include a software module to communicate with other task agents 112, 114, 116 to obtain the particular description or relationship of the task folder. It should be understood that the description of the task folders 104, 106, or 108 identified by the master agent 410 is not necessarily a textual description, but may be a code or identifier that is recognizable by the master agent 401 or by a backend planning system. Using the identified description or relationship of the folders and the tasks in the default folder, the master agent 410 may be configured to automatically direct the tasks 408', 410', 412' in the default folder.

For example, a task may be created by the backend planning application 404 or by the task distribution subsystem 401 such that the task includes information indicating that any task executor in the "tank group A" may perform the task in "floor 1" using a pump. Then the master agent 410 may direct the task to the folder(s) assigned to the tank group A, the floor 1, the pumps on the floor 1, or a combination thereof. In another example, the task agents 112, 114, 116 linked to the task folders 104, 106, 108 may send a query to the master agent 410 to pull tasks from the default folder 402. Alternatively, the task agents 112, 114, 116 linked to the task folders 104, 106, 108 may pull tasks from the default folder 402 without the need to send a query to the master agent 410. The master agent 410 may then identify the description or relationship of the task folders 104, 106, or 108 linked to the task agent and direct tasks from the default folder 402 to the task folder 104, 106, or 108 according to the identified description or relationship. As previously described, the description of the task folders 104, 106, or 108 identified by the master agent 410 may be a code or an identifier that is recognizable by the master agent 401 or by a backend planning system.

In some embodiments, an administrative user (e.g., a system user with supervisory or administrative clearance) may manually direct the tasks in the default folder 402 to other folders 104, 106, 108 by accessing the default folder 402. For example, a supervisor user may access the default folder 402 (and other task folders 104, 106, 108) using a workstation or display device capable of displaying a user interface. In some embodiments, the supervisors user interface may have features similar to the UI 200 described in connection with FIG. 2. Also, the supervisor user may also create new tasks in the default folder 402 so that the created task is directed by the master agent 410 to the targeted task folder 104, 106, 108.

Figure 5:
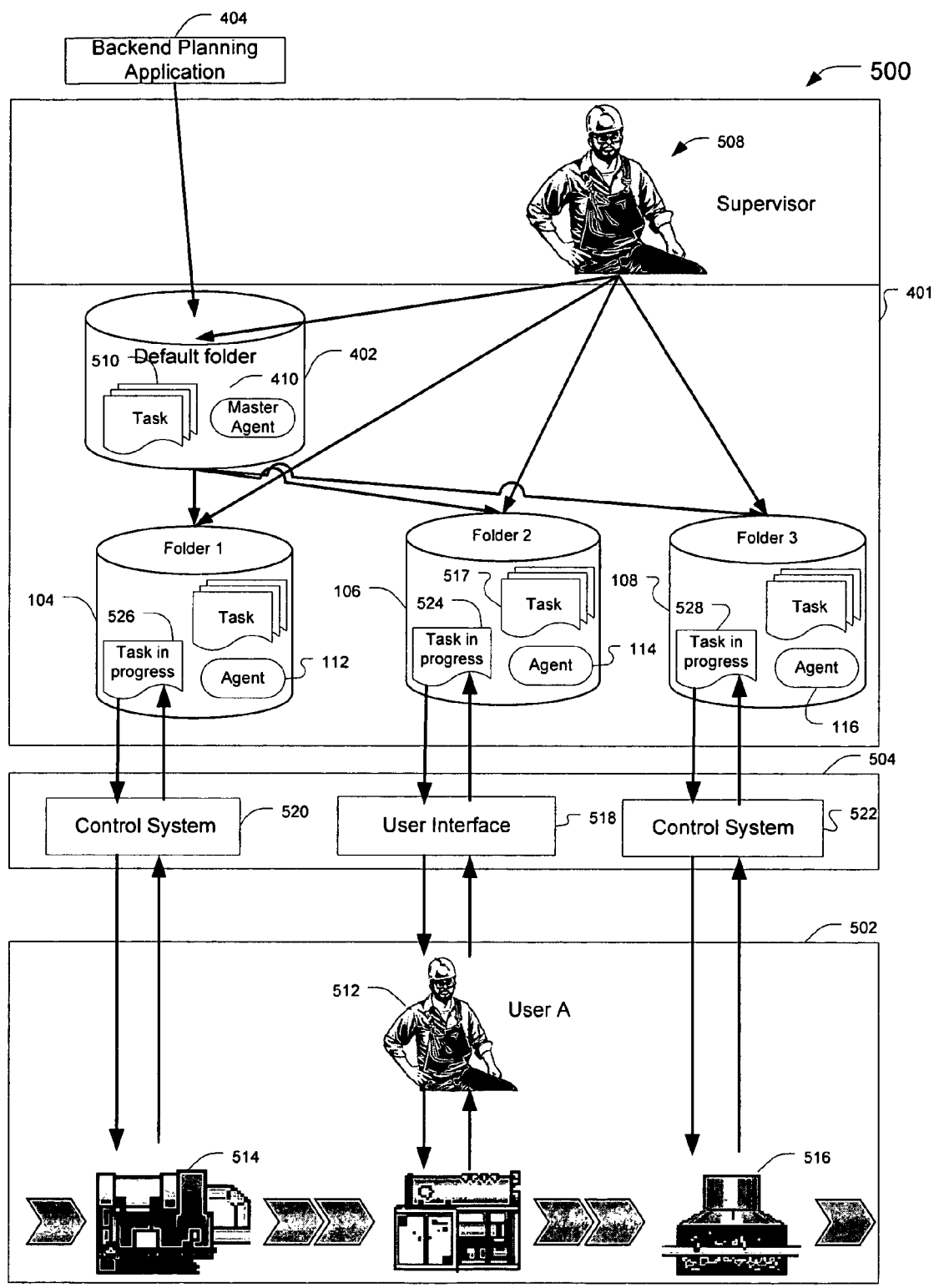
FIG. 5 is a diagram of a particular embodiment of a task responsibility system implemented in a work environment.

Referring to FIG. 5, some embodiments of the task responsibility system 500 may provide flexible interaction between the task distribution subsystem 401 and an exemplary work environment 502 using a communication interface 504. The work environment 502 may be a manufacturing or a production environment, a warehouse environment, or other work environment. The integration of the task distribution subsystem 401 and the work environment 502 in the task responsibility system 500 may allow tasks to be directed into the task folders 104, 106, 108 independent of task executors 512, 514, 516 that are assigned to those folders. The system 500 may also allow task executors 512, 514, 516 in the work environment 502 to be dynamically assigned to the task folders depending on their current area of responsibility, the current staffing of the work environment 502, the available resources in the work environment 502, any exceptional circumstances (e.g., machine failure, supply shortage, worker illness, etc.), or other factors.

In some embodiments, a backend planning application 404 (or other applications) and a supervisor user 508 (e.g., a local supervisor at the manufacturing plant) may transfer or create tasks 510 in the default folder 402. The planning application 404 or the supervisor 508 may create the task 510 according to particular transactions (e.g., similar to the transactions 118, 120, 122 described in connection with FIG. 1). For example, the backend planning application 404 may automatically create a number of tasks and direct such tasks to the default folder 402 based upon a transaction or other business object, as previously described. In another example, a supervisor user 508 may create tasks in the default folder 402 after receiving a transaction document in the course of business. In a further example, the supervisor 508 may create tasks based upon exceptional circumstances or local conditions in the work environment 502 independent of any tasks directed from the planning application 404. Upon detecting a new event, such as the arrival of a new task or other events, the master agent 410 may respond according to the rules set forth in the master agent 410. As previously described, the master agent 410 may direct the tasks 510 from the default folder 402 to the designated task folder 104, 106, or 108, or the supervisor 508 may access the default folder 402 to manually direct or redirect the tasks 510.

In some embodiments, the system 500 may provide local control over organization of the task folders 104, 106, 108. For example, a local supervisor user 508 may be equipped to create new or substitute task folders based upon the needs of the local work environment 502 or changes to the local resources available in the work environment 502. In these circumstances, the task distribution system may be organized by a local supervisor user 508 in a manner generally independent from the backend planning systems and logic so to provide a suitable transition between the conceptual world of the early planning stages and the reality of the manufacturing floor or other work environment. For example, the local supervisor user 508 may create new or substitute task folders based upon the needs of the local work environment 502 without the need to first request such a change from a remote administrator of the back end planning application 404.

The work environment 502 may include task executors, such as a human user 512, a first machine 514, and a second machine 516. The user 512 and the machines 514, 516 may communicate with the task distribution subsystem 401 using the various interfaces provided by the communication interface 504. For example, the human user 512 may employ a user interface 518, such as the UI 200 (FIG. 2), the UI 300 (FIG. 3), or other such interface, to access the task folder 106 to which the user 512 has been assigned. As such, the user 512 may view a complete number of tasks 517 in his or her area of responsibility (at least partially defined by the folders to which the user 512 has been assigned). In another example, the machines 514, 516 may access the task folders 104, 108 using the control system 520, 522 configured to provide communications between the task folders 104, 108 and the production machine 514, 516. In some embodiments, the control systems 520, 522 may be real-time control systems that include communication features, such as PCS (e.g., a process control system), PLC (e.g., Programmable Logic Controller), LIMS (e.g., Laboratory Management Information Systems), or the like. Task executers 512, 514, 516 in the work environment 502 may use the communication interface 504 to process the tasks 524, 526, 528 in their respective areas of responsibility. For example, the user 512 may employ a user interface 518 to view a list of waiting tasks 517, select a task 524 in process, forward tasks in the task folder 106 to other folders, or take other actions. In another example, the machines 514, 516 may use the control system 520, 522 to receive information, such as instructions or quantities related to tasks 526, 528, which are currently in process. In some embodiments, the user 512 and the machines 514, 516 may also communicate with the tasks 524, 526, 528 to update the status of the tasks 524, 526, 528. For example, the user 512 and the machines 514, 516 may change the status of the tasks 524, 526, 528 to "completed" or "acknowledged." In another example, the machine 514 may communicate, via the control system 520, that a stoppage of the task 526 has occurred because a failure in the power, the supply source, the machine itself, or another factor. In a further example, the machine 516 may communicate an alert, via the control system 522, that the material supply is low for processing the task 528. When the task folders 104, 106, 108 receive an event message, the task agents 112, 114, 116 may react according to the predetermined rules, for example, by creating another task or alert, by communicating an alert to a supervisor user 508, by forwarding a task to another folder, or other such acts.

Figure 6A:
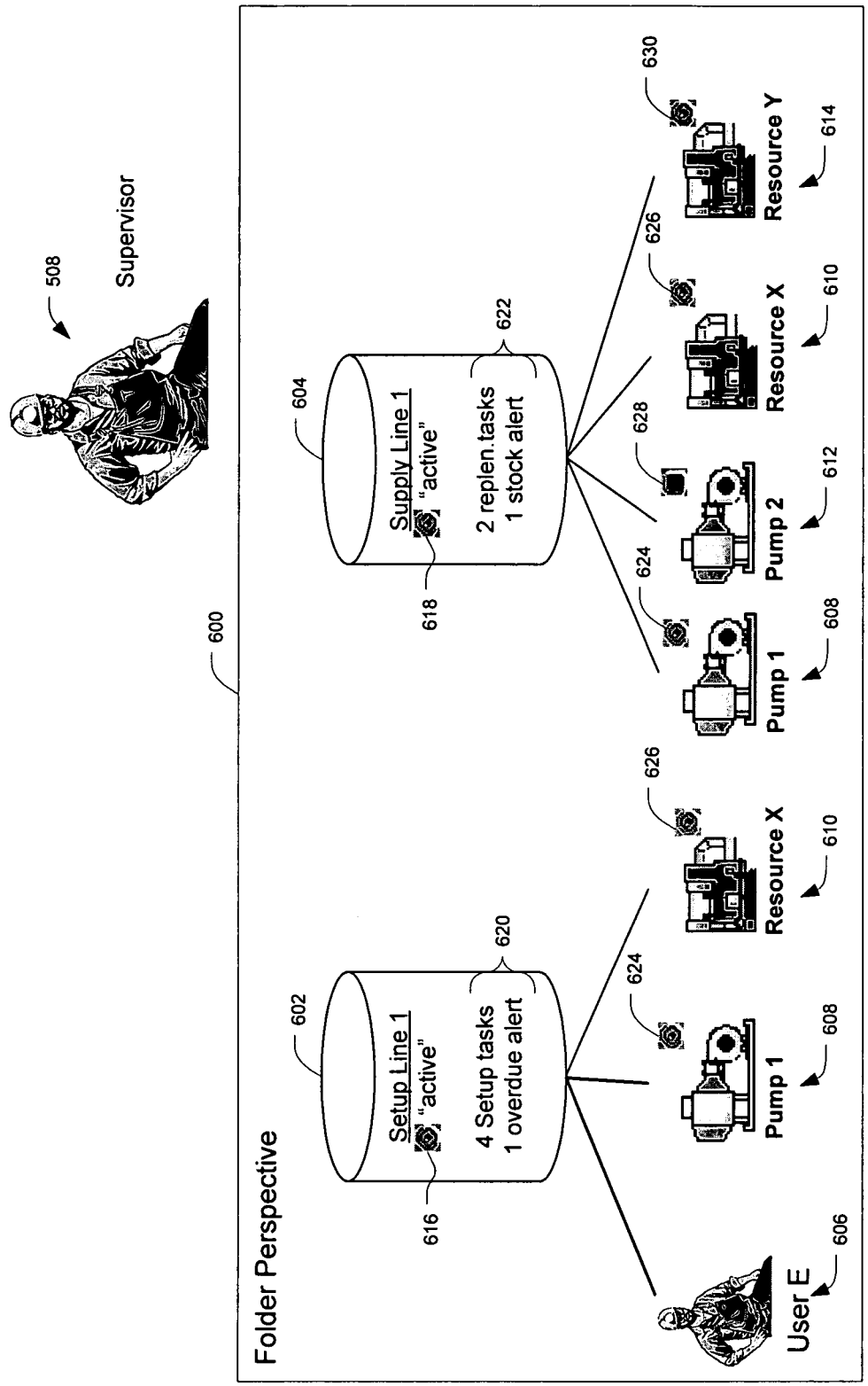
FIG. 6A is an example of task responsibilities viewed from a folder perspective in accordance with some embodiments of the invention.

In some embodiments, the supervisor user 508 may be able to monitor the work environment 502 in different perspectives to facilitate the efficient execution of the tasks in the work environment 502. For example, the supervisor 532 may monitor the work environment 500 from a folder perspective, from a resource perspective, from a transaction perspective, from a user perspective, or from a combination thereof. Examples of such perspectives are described in connection with FIGS. 6A-D Referring to FIG. 6A, the supervisor user 508 may monitor the work environment 502 using a folder perspective view 600. In the depicted example, the folder perspective view 600 may permit the supervisor user to monitor the tasks and task executors associated with a task folder 602 for the "setup line 1" and with a task folder 604 for the "supply line 1". For example, the supervisor user 508 may be capable of using the folder perspective view 600 assign or reassign task executors for the task folders 602, 604, such as a human user 606 and machines 608, 610, 612, 614. In this example, the user 606 is assigned to the task folder 602. The machine 612 and the machine 614 are assigned to the task folder 604. The machine 608 and the machine 610 are assigned to both task folders 602, 604. In some embodiments, the task folders 602, 604 may display a status indicator 616, 618, and a summary of tasks 620, 622. The status indicator 616, 618 may indicate the current working condition of the task folder (e.g., "active," "stopped," "delayed," "ahead of schedule," "behind schedule," "satisfying quota," etc.), or the condition in the area related to the task folder (e.g., "active," "shutdown," "closed for emergency," etc.). For example, the folder perspective view 600 may display that the status indicator 616 of the task folder 602 is "active," indicating that the tasks in the task folder 602 is currently being executed, or the area "setup line 1" is currently in production mode. The folder perspective view 600 may also include machine status indicators 624, 626, 628, 630 to indicate the current conditions of the machines 608, 610, 612, 614. For example, the status indicator 626 (e.g., a green light) may indicate that the machine 610 is actively operating. In another example, the status indicator 628 (e.g., a red cross) may indicate that the pump 612 is broken and need maintenance or is otherwise stopped. By monitoring the conditions and the status of the task folders 602, 604 and their related task executors 606, 608, 610, 612, 614, the supervisor user 508 may assign or reassign task executors, direct or redirect tasks, create additional tasks, or take other actions to provide efficient task execution in the work environment 502. As such, the supervisor user may use the folder perspective to monitor and adjust the work flow in real-time.

For example, the supervisor user 508 may observe from the folder perspective 600 that there is an overdue alert in the task folder 602 of the "setup line 1." The supervisor user 508 may assign other task executors in the work environment (e.g., the task executors assigned to the task folder 604 or other resources) to aid the performance of tasks in task folder 602, which may resolve the overdue alert or otherwise add efficiency to the production process. In another example, the supervisor user 508 may observe from the folder perspective 600 that there is a stock alert in the task folder 604 of the "supply line 1." The supervisor user 508 may, for example, contact the supplier for more stock, communicate with the backend application to deliver more stock, or create a task to deliver more stock to the supply line 1. In a further example, the supervisor user 508 may observe from the folder perspective 600 that the "pump 2" 612 is not active. In such circumstances, the supervisor user 508 may redirect particular tasks, which are currently directed to the "pump 2" 612, to other pumps (e.g., "pump 1" 608) and create a repair task directed to the human user 606 (e.g., to repair or reactivate the pump 2).

Figure 6B:
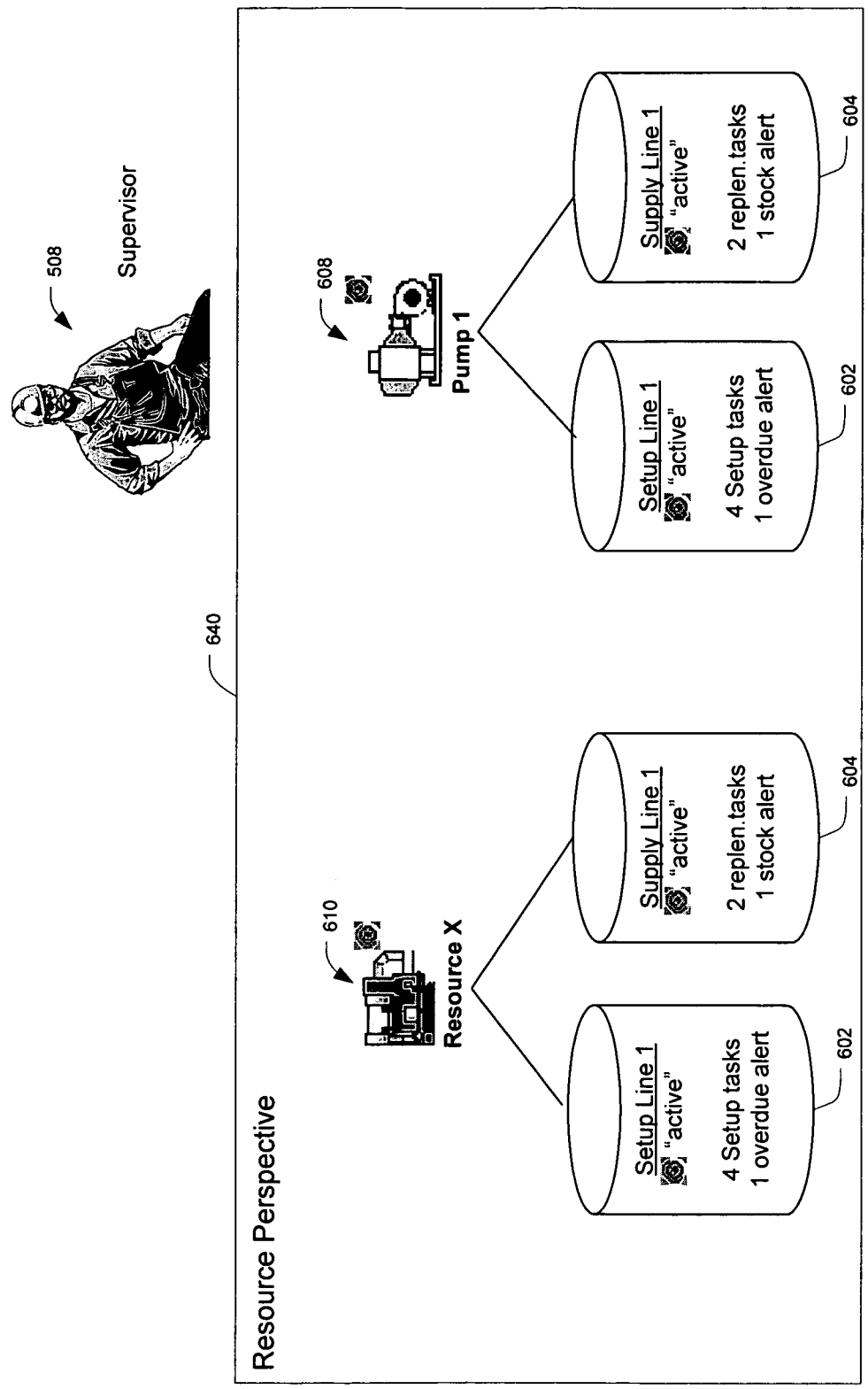
FIG. 6B is an example of task responsibilities viewed from a resource perspective in accordance with some embodiments of the invention.

Referring to FIG. 6B, the supervisor user 508 may monitor the work environment 502 using a resource perspective view 640. In the depicted example, the resource perspective view 632 may permit the supervisor user 508 to monitor the tasks and task folders 602, 604 associated with particular machines or other resources, such as the machine 610 and the machine 608. In some circumstances, the resource perspective view 640 provides the supervisor user 508 with a convenient summary of each machine's area of responsibility (defined at least partially by the task folders 608, 610 to which each machine has been assigned). As such, a supervisor user 508 may use the resource perspective 640 to monitor, adjust, or assess the task folders 602, 604 to which each machine 608, 610 has been assigned and the machine's area of responsibility. In such embodiments, the supervisor user 508 may monitor the status of the resources in the work environment 502 and direct tasks to the resources efficiently. For example, the supervisor user 508 may receive notice from the resource perspective view 640 that there is an overdue alert in the task folder 602. In response, the supervisor user 508 may then assign other resources to the task folder 604 or set a higher priority to the task folder 602 to decrease execution time. Accordingly, the resource perspective view 640 may facilitate the efficient execution of the tasks in the work environment 502.

Figure 6C:
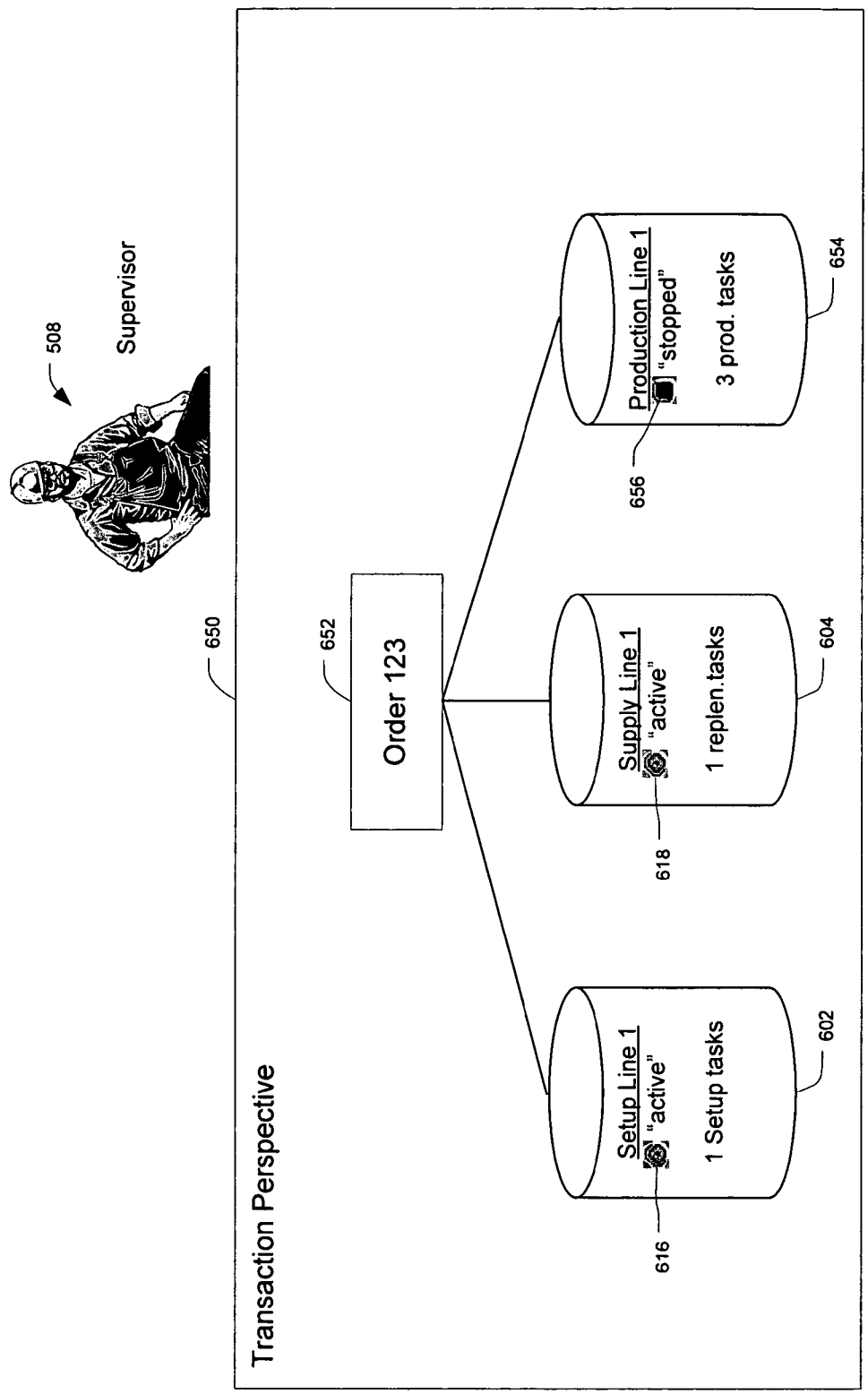
FIG. 6C is an example of task responsibilities viewed from a transaction perspective in accordance with some embodiments of the invention.

Referring to FIG. 6C, the supervisor user 508 may monitor the work environment 502 using a transaction perspective view 650. In some embodiments, the transaction perspective view 650 may be configured to display task folders 602, 604, 654 and tasks that are related to a particular transaction (e.g., similar to the transactions 118, 120, and 122 previously described in connection with FIG. 1). In the depicted example, the transaction perspective view 650 may identify a transaction 652, such as an order number that requests the production of a certain quantity of products. The transaction perspective view 650 may display the task folders 602, 604, 654 that are related to the transaction 652 (e.g. "Order 123") so that a supervisor may efficiently monitor the progress of a particular order through the entire manufacturing plant or other work environment. For example, the transaction perspective view 650 may display only tasks that are related to the transaction 652 selected for monitoring by the supervisor user 508. In this depicted example, the task folders 602, 604 in the transaction perspective view 650 include only one setup tasks and one replenish task, respectively, that are related to the selected transaction 652. Using the transaction perspective view 650, the supervisor user 508 may efficiently monitor the progress of a particular transaction and react to exceptional situations, such as line failures, line overloads, work stoppages, material shortages, quality problems, or the like. For example, the supervisor user 508 may notice a "stopped" status 656 in the task folder 654 for the "production line 1."

Because the stoppage of "production line 1" may slow the progress of the transaction (e.g., "order 123"), the supervisor user 508 may create tasks for a human user to investigate and report the cause for the stoppage and may redirect the tasks in the task folder 656 into other task folders. As such, the transaction perspective view 650 may facilitate the efficient execution of the tasks in the work environment 502 as they related to at least one particular transactions 652.

Figure 6D:
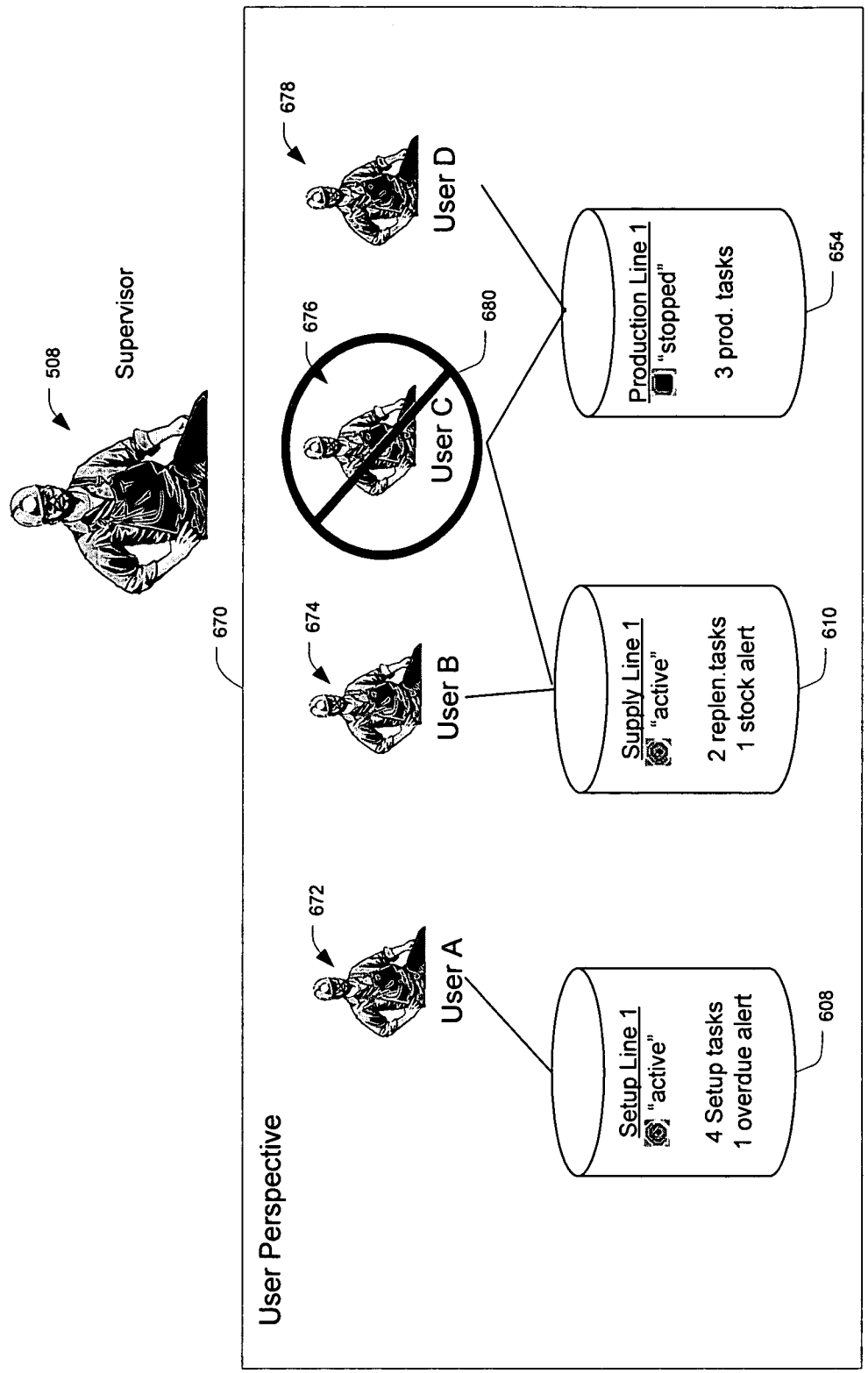
FIG. 6D is an example of task responsibilities viewed from a user perspective in accordance with some embodiments of the invention.

Referring to FIG. 6D, the supervisor user 508 may monitor the work environment 502 using a user perspective view 670. In the depicted example, the user perspective view 670 may permit the supervisor user 508 to monitor the tasks and task folders 608, 610, 654 associated with particular task executors, such as a plurality of users 672, 674, 676, 678. The user perspective view 670 may indicate to the supervisor user 508 the working status of each of the users 672, 674, 676, 678 in a group. In such embodiments, the user perspective view 670 may display an image 680 over the user C 676 to indicate that the user C 676 is non-active (e.g., out of the work environment 502 due to illness or vacation, on a lunch break, or the like). In the user perspective view 670, the supervisor user 508 may direct or redirect the tasks in the task folders 608, 610, 654 to the users 672, 674, 676, 678 or to other users not shown in FIG. 6D. For example, the supervisor user 508 may receive notice of the absence of the user C 676, who is currently assigned to the task folder 610. If the supervisor determines that the task folder 610 requires two active workers, the supervisor user 508 may assign another user (e.g., user A 672 or user D 678) to the task folder 610 to handle the responsibility of user C 676 during the absence of user C 676. In another example, the supervisor user 508 may be notified that the status 656 of the task folder 654 is "stopped." To facilitate the efficient execution of the tasks in a real-time manner, the supervisor user 508 may assign the user D 678 to another task folder because the user D 678 is presently assigned to a stopped production line.

Figure 7:
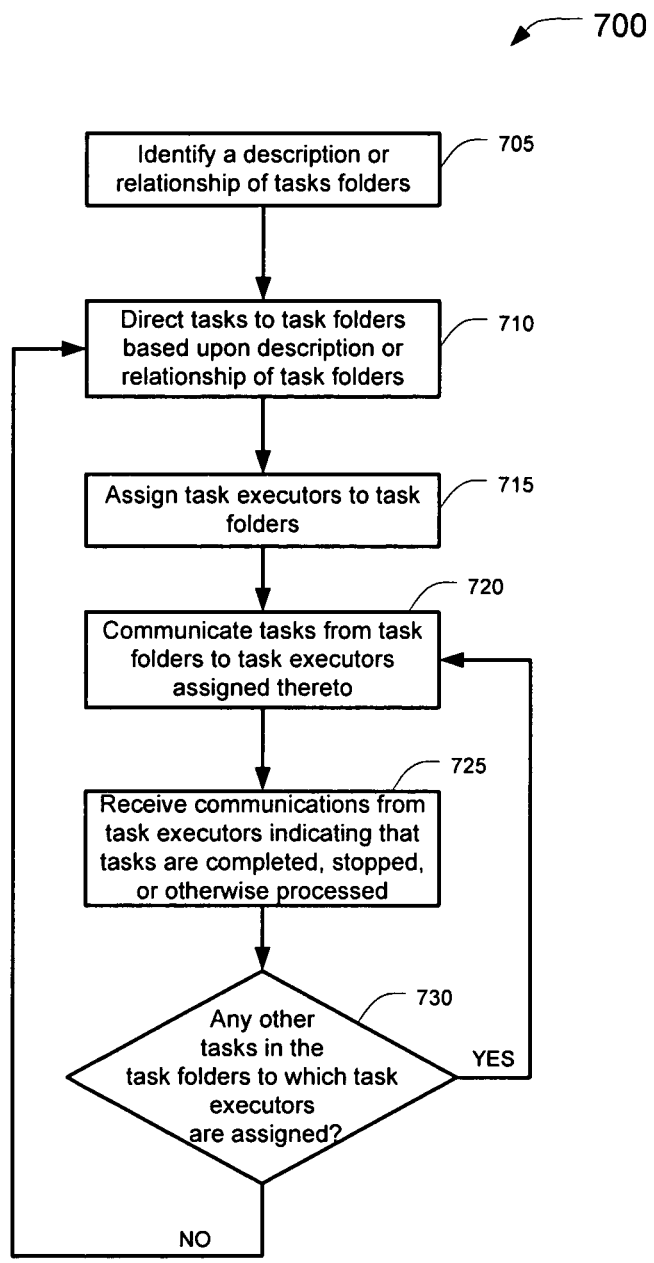
FIG. 7 is a flow chart of some operations in a method for directing tasks to task executers.

Referring to FIG. 7, in some embodiments, a method 700 to direct tasks to task folders and to task executors may be executed by the task responsibility systems described herein. In some implementations, at least a portion of the method 700 may be executed manually, for example, by a supervisor user. In some implementations at least a portion of the method may be executed automatically, for example, by a master agent, a task agent, or a combination thereof. The method 700 may include an operation 705 to identify a description or relationship of the one or more task folders. It should be understood that the description of the task folders is not necessarily a textual description, but may be a code or an identifier. As previously described in connection with FIG. 4, the task responsibility system 100 may be configured to identify the relationship between the incoming tasks and the existing task folders in the system. The method 700 may include an operation 710 to direct tasks to task folders based upon the identified description or relationship of the task folders in an operation. In one example, a master agent may include rules in a software module that are capable of identifying the code, identifier, name, or other description of the task folders so that the incoming tasks having dispatch information similar to the code, identifier, name, or other description of the task folder may be directed thereto. Alternatively, a supervisor user 508 may operated the system to direct tasks to the desired task folders.

The method 700 may include an operation 715 to assign task executors to task folders. In such circumstances, the assigning a task executor to a particular task folder may permit the tasks therein to be communicated to the task executor. As previously described, the operation 710 to direct tasks to task folders may be executed independently of the operation 715 in which task executors are assigned to task folders. As such, the tasks are not necessarily assigned directly to a particular worker, but rather the one or more tasks may be directed to the task folder independent of the task executor assigned thereto. In such circumstances, the task executors may be assigned to particular task folders in a flexible manner so as to efficiently complete the tasks. The method 700 may include an operation 720 to communicate tasks from task folders to assigned task executors. In some implementations, the tasks may be communicated by displaying a user interface (e.g., UI 200 or UI 300) or by way of a real-time control system in communication with a machine.

Still referring to FIG. 7, the method 700 may include an operation 725 to receive communication from task executors indicating that particular tasks have been completed, stooped, or otherwise processed. For example, a human user may communicate the a particular task has been completed by selecting a "confirm" or "completed" button on a user interface (e.g., UI 200 or UI 300). The task agent or other portion of the system may receive this communication and respond accordingly. The method 700 may include an operation 730 to determine whether there are other tasks in the task folders to which the task executors are assigned. If yes, the method 700 may communicate one or more of those additional tasks to the task executor (e.g. (return to the operation 720). If no, the method 700 may direct addition tasks to the emptied task folder (e.g., return to the operation 710). Thus, the method 700 may permit a worker or machine to be dynamically assigned to a task folder (even after the tasks have been directed thereto), and in these embodiments, the tasks may be distributed to the task folders and monitored for efficient completion by the workers or machines in the work environment.

Figure 8:
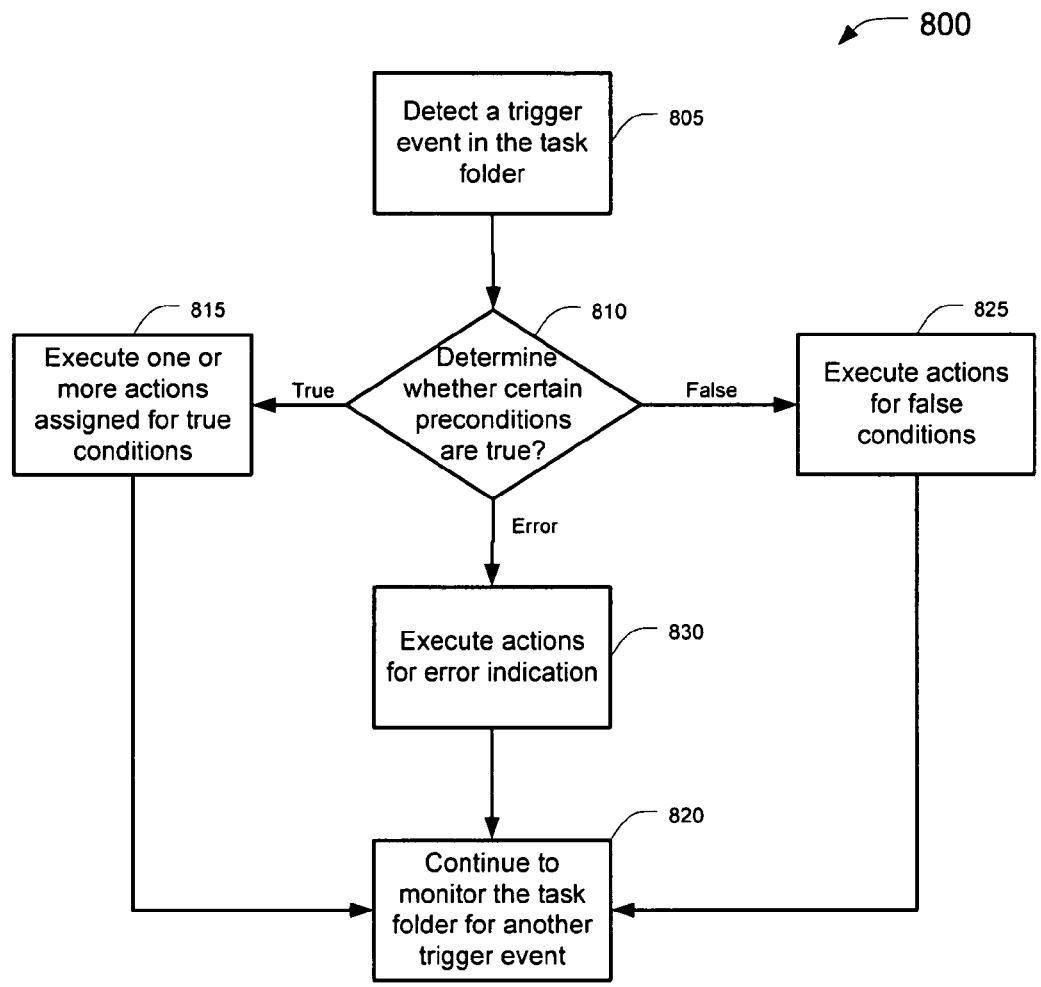
FIG. 8 is a flow chart of some task agent operations in accordance with particular embodiments of the invention.

Referring to FIG. 8, in some embodiments, a method 800 for executing actions based upon certain trigger events may be performed by an agent (e.g., a task agent or a master agent). As previously, described, a task agent may be configured to automatically process tasks in a task folder and may comprise a software module that contains rules to perform actions in response to a trigger event (e.g., the arrival of a new task in the folder). Thus, the task agent may serve as a virtual user that is permanently watching the linked task folder and may perform a predetermined action when a trigger event occurs in the task folder. For example, the task agent may automatically execute incoming tasks by communicating the tasks to task executors. In another example, the task agent may automatically acknowledge incoming alerts. In a further example, the task agent may execute periodic actions (e.g., automatically forwarding tasks that are not processed after a set period of time).

The method 800 may include an operation 805 to detect a trigger event in the task folder. The trigger event may be a task event (e.g., "task created", "task completed", "alert acknowledged", etc.), a task folder event (e.g., "new task received", "task forwarded", "user logon/logoff", etc.), a task agent event (e.g., "condition error occurred"), a work environment event (e.g., "maximum temperature of vessel ABC is exceeded", "machine stopped", etc.), or the like in the method 800 may also include an operation 805 to determine whether certain preconditions are true. For example, the precondition may ask whether today is a Sunday or a holiday. In another example the precondition may ask whether a task status has been changed to "failed" or "stopped." In some implementations, a test on the condition may return a "true," a "false," or an "error."

If the task agent determines that the precondition is true, the method may include an operation 815 to execute one or more actions assigned for the true conditions. In some implementations, the task agent may be configured to perform one or a sequence of actions based upon a trigger event. The actions may also be configured such that the actions may apply to some or all of the tasks in the task folder. Some examples of actions may be to forward a task to another task folder, to delete a task from the folder, to execute another task, to change an attribute (e.g., the production quantity) of a task, to print task on a printer, to create an alert task to the default folder, to send a text message to the supervisor, or the like. After executing the actions, the method may include an operation 820 to monitor the task folder for another trigger event.

If, in the operation 810, the task agent determines that the preconditions are false, the method 800 may include an operation 825 to execute one or more actions for the false conditions in an operation 825. For example, the task agent may forward a task to another task folder, may create an alert task to the default folder, may send a text message to the supervisor, or the like. After executing the actions, the method may include an operation 820 to monitor the task folder for another trigger event.

If, in the operation 810, the task agent determines that an error has occurred, the method 800 may include an operation 830 to execute one or more actions for the error conditions. For example, the task agent may transmit an error message to the supervisor user, write an entry to the task folder, or the like. After executing the actions, the method may include an operation 820 to monitor the task folder for another trigger event.

Figure 9:
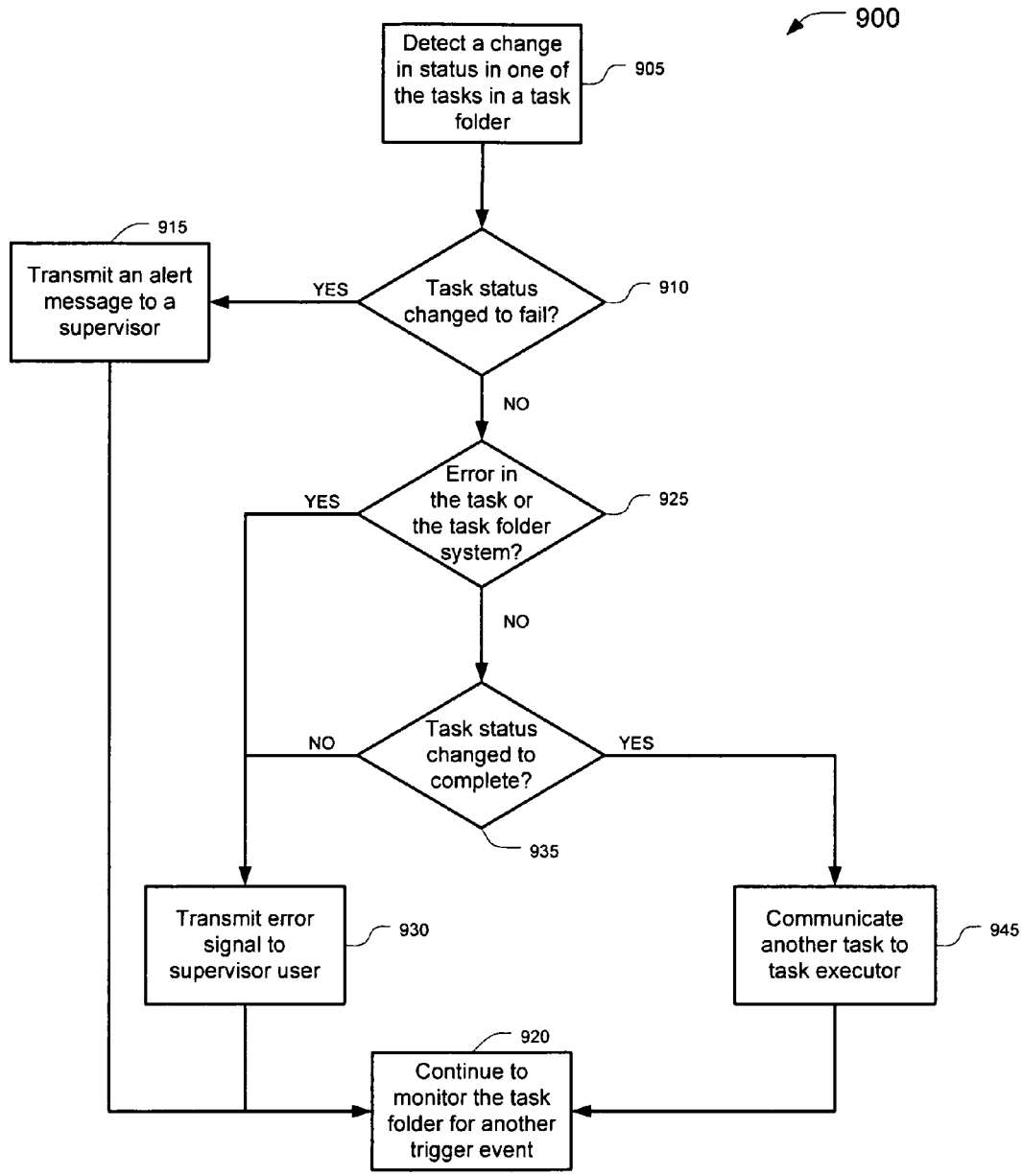
FIG. 9 is a flow chart of some task agent operations in accordance with particular embodiments of the invention.

Referring now to FIG. 9, one example of a method 900 for executing actions based upon trigger events may occur when the trigger event is a change in status of a task. The method 900 may include an operation 905 to detect a change in the status in one of the tasks in a task folder to which the task agent is linked. For example, the status of a task may be changed from "in progress" to "fail" or to "complete." The method 900 may also include an operation 910 to determine whether the status of the task is changed to "fail." If yes, the method 900 may include an operation 915 to perform an action in response thereto. For example, operation 915 may comprise transmitting an alert message (e.g., SMS message, text message to a supervisor user. After performing the operation 915, the method 900 may include an operation 920 to continue monitoring the task folder for another trigger event.

If, in the operation 910, the task agent determines that the status is not changed to "fail," the method 900 may include an operation 925 determine whether there is an error in the task or the task folder. For example, an error may be determined if a machine is stopped, if a worker is unavailable to respond or has entered an improper quantity, or the like. If yes, the method 900 may include an operation 930 to send an error signal to a supervisor user. After performing the operation 930, the method 900 may include an operation 920 to continue monitoring the task folder for another trigger event.

If the task agent determines that there is no error in the task or the task folder in the operation 925, in the method 900 may include an operation 935 to determine whether the task status is changed to "completed." Also, the method 900 may include an operation 945 to communicate another task to task executor because the first task has been completed. After performing the operation 945, the method 900 may include an operation 920 to continue monitoring the task folder for another trigger event.

If the task agent determines, in the operation 935, that the task status is not changed to "complete," the method 900 may include an operation 930 to send an error signal to a supervisor user. For example, if the task status is not changed to "fail," "error," or "completed," the situation may require the attention of a supervisor user. After performing the operation 930, the method 900 may include an operation 920 to continue monitoring the task folder for another trigger event.

Some of the embodiments described herein may be implemented in digital electronic circuitry, or in computer hardware, firmware, software, or in combinations of them. Apparatus of the task responsibility system can be implemented in one or more computer program products tangibly embodied in an information carrier, e.g., in a machine-readable storage device or in a propagated signal, for execution by a programmable processor. Also, some implementations of the methods described herein can be performed by a programmable processor executing a program of instructions to perform functions described herein by operating on input data and generating output. The systems or methods described herein can be implemented in one or more computer programs that are executable on a programmable system including at least one programmable processor coupled to receive data and instructions from, and to transmit data and instructions to, a data storage system, at least one input device, and at least one output device. A computer program may comprise a set of instructions that can be used, directly or indirectly, in a computer to perform a certain activity or bring about a certain result. The computer program may be written in any form of programming language, including compiled or interpreted languages, and it can be deployed in any form, including as a stand-alone program or as a module, component, subroutine, or other unit suitable for use in a computing environment.

Figure 10:
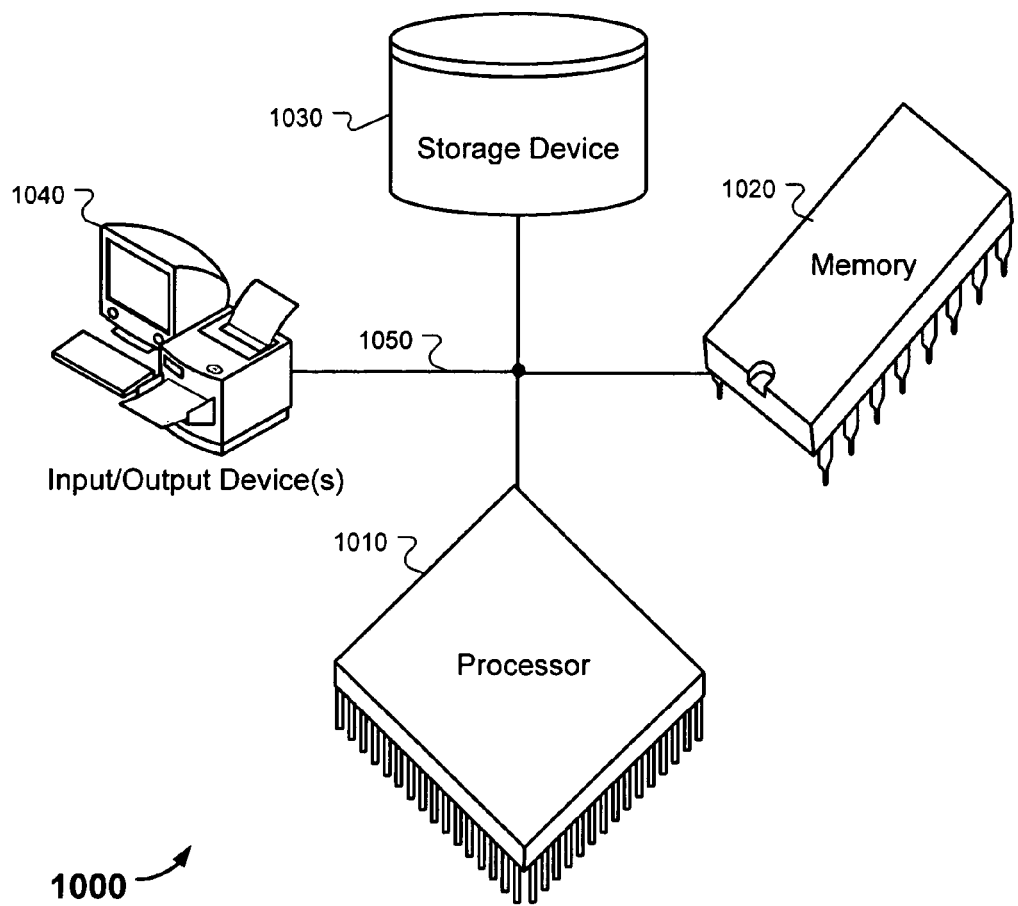
FIG. 10 is a diagram of one embodiment of a computer system for implementing at least a portion of a task responsibility system, in accordance with some embodiments of the invention.

Referring to FIG. 10, in some embodiments, at least a portion of the task responsibility system may be implemented on a computer system 1000, which may include a processor 1010, memory 1020, a storage device 1030, and one or more input-output devices 1040. Suitable processors for the execution of a program of instructions include, by way of example, both general and special purpose microprocessors, and the sole processor or one of multiple processors of any kind of computer. In some implementations, a processor 1010 may receive instructions and data from computer memory 1020, such as a read-only memory or a random access memory or both. A computer system 1000 may also include, or be operatively coupled to communicate with, one or more mass storage devices 1030 for storing data files. Such devices can include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. In some implementations, the processor and the memory can be supplemented by, or incorporated in, ASICs (application-specific integrated circuits). The input/output devices 1040 may include a display device, such as a CRT (cathode ray tube) or LCD (liquid crystal display) monitor, and a keyboard and a pointing device (e.g., a mouse or a trackball) by which the user can provide input to the computer system.

The task responsibility system can be implemented in a computer system that includes a back-end component, such as a data server, or that includes a middleware component, such as an application server or an Internet server, or that includes a front-end component, such as a client computer having a graphical user interface or an Internet browser, or any combination of them. The user interface may be implemented using a display device, such as a CRT (cathode ray tube) or LCD (liquid crystal display) monitor, and a keyboard and a pointing device (e.g., a mouse or a trackball) by which the user can provide input to the computer. The components of the computer system may be connected by a medium of digital data communication, such as a communication network. Examples of communication networks include, e.g., a LAN, a WAN, and the computers and networks forming the Internet.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for directing tasks to be performed by one or more task executors in a work environment, the method comprising:

directing a first set of tasks to a first computer-implemented folder assignable to multiple different task executors, at least one of the tasks representing a work item to be performed in a work environment;

after the tasks are directed to the computer-implemented folder, assigning a selected task executor to the first computer-implemented folder so that the tasks are electronically communicated to the selected task executor indicating that the tasks are to be completed by the selected task executor, the selected task executor comprising a human user in the work environment;

assigning the selected task executor to a second computer-implemented folder so that a second set of tasks directed to the second computer-implemented folder is electronically communicated to the selected task executor; and after the selected task executor is assigned to both the first and second computer-implemented folders, displaying a work list for at least one the first and second sets of tasks to selected task executor on a graphical user interface in the work environment.

2. The method of claim 1, further comprising, after at least the first set of tasks are electronically communicated to the selected task executor, receiving a communication from the selected task executor indicating that at least one of the tasks from the first set of tasks was completed by the selected task executor.

3. The method of claim 1, wherein the multiple different task executors are dynamically assignable to the first computer-implemented folder subsequent to the first set of tasks being directed to the first computer-implemented folder.

4. The method of claim 1, wherein the first set of tasks are directed to the first computer-implemented folder independent of the selected task executor assigned to the first computer-implemented folder.

5. The method of claim 1, wherein the first set of tasks are directed to the first computer-implemented folder from a backend planning application.

6. The method of claim 5, further comprising linking at least one computer-implemented task agent to the first computer-implemented folder to respond to a trigger event related to at least one task from the first set of tasks.

7. The method of claim 1, further comprising:

displaying to a supervisory user on a first user interface in the work environment the first computer-implemented folder that received the first set of tasks; and receiving assignment input from the supervisory user to assign the selected human task executor to the first computer-implemented folder so that the first set of tasks is electronically communicated to the selected human task executor indicating that the first set of tasks are to be completed by the human task executor, wherein the work list of the first set of tasks is displayed to the selected human task executor on the graphical user interface in the work environment.

8. A computer-implemented method for directing tasks to be performed by one or more task executors in a work environment, the method comprising:

displaying to a supervisory user on a first user interface in a work environment a first computer-implemented folder that received a first set of tasks, at least one task from the first set of tasks representing a work item to be performed by a human worker in the work environment;

receiving assignment input from the supervisory user to assign a human task executor to the first computer-implemented folder so that the first set of tasks is electronically communicated to the human task executor indicating that the first set of tasks are to be completed by the human task executor, wherein a work list of the first set of tasks is displayed to the human task executor on a second user interface in the work environment;

after the first set of tasks are electronically communicated to the human task executor, receiving confirmation input from the human task executor indicating that at least one task from the first set of tasks was completed by the human task executor;

displaying to the supervisory user on the first user interface in the work environment a second computer-implemented folder that received a second set of tasks, at least one task from the second set of tasks representing a work item to be performed by a machine in the work environment;

receiving assignment input from the supervisory user to assign a machine task executor to the second computer-implemented folder so that the second set of tasks is electronically communicated to the machine task executor indicating that the tasks are to be completed by the machine task executor; and after the second set of tasks are electronically communicated to the machine task executor, receiving communication from the machine task executor indicating that at least one task from the second set of tasks was completed by the machine task executor.

9. The method of claim 8, wherein the human task executor is dynamically assigned to the first computer-implemented folder subsequent to the first set of tasks being directed to the first computer-implemented folder.

10. The method of claim 9, wherein the first set of tasks is directed to the first computer-implemented folder independent of the human task executor assigned to the first computer-implemented folder, and wherein the second set of tasks is directed to the second computer-implemented folder independent of the machine task executor assigned to the second computer-implemented folder.

11. The method of claim 8, further comprising receiving assignment input from the supervisory user to assign a plurality of human task executors to the first computer-implemented folder so that the first set of tasks is electronically communicated to each of the plurality of human task executor.

12. The method of claim 8, wherein at least one task from the second set of tasks represents a work item to be performed by a second human worker in the work environment, the method further comprising receiving assignment input from the supervisory user to assign a second human task executor to the second computer-implemented folder after the machine task executor is assigned to the second computer-implemented folder.

13. The method of claim 12, wherein at least a portion of the second set of tasks is communicated to the second human task executor via a graphical user interface in the work environment.

14. The method of claim 12, wherein at least a portion of the second set of tasks is communicated to the machine task executor via a machine control system.

15. The method of claim 8, wherein the first set of tasks is directed to the first computer-implemented folder from a backend planning application.

16. The method of claim 15, further comprising linking at least one computer-implemented task agent to the first computer-implemented folder to respond to a trigger event related to at least one task from the first set of tasks.

17. The method of claim 8, wherein the first computer-implemented folder is created using the first user interface of the supervisory user in the work environment based at least in part upon local needs of the work environment.

18. A computer system for directing tasks to be performed by task executors in a work environment, the computer system comprising:

a first computer-implemented folder to receive a first set of tasks representing work items to be performed by a human worker in the work environment, the first computer-implemented folder being assignable to multiple different human task executors;

a second computer-implemented folder to receive a second set of tasks representing work items to be performed by a machine in the work environment, the second computer-implemented folder being assignable to multiple different machine task executors; and an executable program stored on a computer-readable medium that, when executed, causes the following operations to occur:

display to a supervisory user on a first user interface in the work environment the first computer-implemented folder to which the first set of tasks was directed;

receiving assignment input from the supervisory user to assign a human task executor to the first computer-implemented folder;

in response to the assignment input from the supervisory user, electronically communicate to the human task executor that the first set of tasks are to be completed by the human task executor, wherein a work list of the first set of tasks is displayed to the human task executor on a second user interface in the work environment;

receive confirmation input from the human task executor indicating that at least one task from the first set of tasks was completed by the human task executor after the first set of tasks are electronically communicated to the human task executor;

display to the supervisory user on the first user interface in the work environment the second computer-implemented folder to which the second set of tasks was directed;

receive assignment input from the supervisory user to assign a machine task executor to the second computer-implemented folder; and in response to the assignment input from the supervisory user, receiving communication from the machine task executor indicating that at least one task from the second set of tasks was completed by the machine task executor.

19. The computer system of claim 18, wherein the human task executor is dynamically assigned to the first computer-implemented folder subsequent to the first set of tasks being directed to the first computer-implemented folder.

20. The computer system of claim 19, wherein the first set of tasks is directed to the first computer-implemented folder independent of the human task executor assigned to the first computer-implemented folder, and wherein the second set of tasks is directed to the second computer-implemented folder independent of the machine task executor assigned to the second computer-implemented folder.

* * * * *